US008298065B2

(12) United States Patent
Berman et al.

(10) Patent No.: US 8,298,065 B2
(45) Date of Patent: Oct. 30, 2012

(54) GAMING ACTIVITY WITH SECONDARY SYMBOLS FORMING RANDOM PAYLINES

(75) Inventors: Bradley Berman, Minnetonka, MN (US); Rebecca Schuh, Long Grove, IL (US); Jason Malkovich, Chaska, MN (US)

(73) Assignee: King Show Games, Inc., Minnetonka, MN (US)

( * ) Notice: Subject to any disclaimer, the term of this patent is extended or adjusted under 35 U.S.C. 154(b) by 999 days.

(21) Appl. No.: 12/077,732

(22) Filed: Mar. 20, 2008

(65) Prior Publication Data

US 2008/0287179 A1 Nov. 20, 2008

Related U.S. Application Data

(60) Provisional application No. 60/919,360, filed on Mar. 22, 2007.

(51) Int. Cl.
*A63F 13/00* (2006.01)

(52) U.S. Cl. ........................................... 463/20; 463/16

(58) Field of Classification Search .................... 463/16, 463/20
See application file for complete search history.

(56) References Cited

U.S. PATENT DOCUMENTS

| | | | | |
|---|---|---|---|---|
| 5,980,384 | A * | 11/1999 | Barrie | 463/16 |
| 6,056,642 | A * | 5/2000 | Bennett | 463/20 |
| 6,261,178 | B1 | 7/2001 | Bennett | |
| 6,896,615 | B2 | 5/2005 | Berman | |
| 2003/0216165 | A1 | 11/2003 | Singer et al. | |
| 2005/0255903 | A1 | 11/2005 | Jackson | |
| 2006/0073879 | A1 | 4/2006 | Baerlocher | |

* cited by examiner

*Primary Examiner* — James S McClellan
(74) *Attorney, Agent, or Firm* — Stolowitz Ford Cowger LLP

(57) ABSTRACT

A gaming activity involves a plurality of gaming reels each having a plurality of first symbols that are randomly arranged in response to a gaming event. The gaming apparatus also includes a plurality of second symbols that are each randomly arranged so that each of the second symbols adjacent to an associated one of the first symbols. A payout device of the apparatus determines a payout based on the arrangement of the first symbols in combination with a payline formed by the associated second symbols in response to the gaming event.

3 Claims, 6 Drawing Sheets

GAMING ACTIVITY WITH SECONDARY SYMBOLS FORMING RANDOM PAYLINES

RELATED APPLICATIONS

This application claims the benefit of Provisional Application No. 60/919,360, filed on Mar. 22, 2007, to which priority is claimed pursuant to 35 U.S.C. §119(e), and which is hereby incorporated herein by reference in its entirety.

FIELD OF THE INVENTION

This invention relates in general to games, and more particularly to apparatuses and methods for wagering games.

BACKGROUND OF THE INVENTION

Casino games such as poker, slots, and craps have long been enjoyed as a means of entertainment. Almost any game of chance that can be played using traditional apparatus (e.g., cards, dice) can be simulated on a computer. The popularity of casino gambling with wagering continues to increase, as does recreational gambling such as non-wagering computer game gambling. It is also likely that most new games will be implemented, at least in part, using computerized apparatus.

One reason that casino games are widely implemented on computerized apparatus is that computerized games are highly adaptable, easily configurable and re-configurable, and require minimal supervision to operate. For example, the graphics and sounds included in such games can be easily modified to reflect popular subjects, such as movies and television shows.

Computer gaming devices can also be easily adapted to provide entirely new games of chance that might be difficult to implement using mechanical or discrete electronic circuits. Because of the ubiquity of computerized gaming machines, players have come to expect the availability of an ever wider selection of new games when visiting casinos and other gaming venues. Playing new games adds to the excitement of "gaming." As is well known in the art and as used herein, the term "gaming" and "gaming devices" generally involves some form of wagering, and that players make wagers of value, whether actual currency or some equivalent of value, e.g., token or credit. Wagering-type games usually provide rewards based on random chance as opposed to skill. In some jurisdictions, the absence of skill when determining awards during game play is a requirement.

The present disclosure describes methods, systems, and apparatus that provide for new and interesting gaming experiences, and that provide other advantages over the prior art.

SUMMARY OF THE INVENTION

To overcome limitations in the prior art described above, and to overcome other limitations that will become apparent upon reading and understanding the present specification, the present invention discloses a gaming system, method, and apparatus for providing a wagering gaming activity. In one embodiment, a gaming apparatus includes a plurality of gaming reels each having a plurality of first symbols that are randomly arranged in response to a gaming event. The gaming apparatus also includes a plurality of second symbols that are each randomly arranged so that each of the second symbols adjacent to an associated one of the first symbols. A payout device of the apparatus determines a payout based on the arrangement of the first symbols in combination with a payline formed by the associated second symbols in response to the gaming event.

In more particular embodiments, the payout device determines the payout based on paylines formed by the second symbols. The paylines may be formed by a sequence of matching second symbols, and the payout is determined based on the first symbols associated with the matching second symbols also matching. In some arrangements, matching first symbols second symbols are part of a secondary play event that occurs after the payout is determined. In such a case, the secondary play event involves, moving the matching second symbols so that the payline formed by the matching second symbols is a substantially straight line and moving the gaming reels having the matching first symbols so that matching first symbols remain associated with the matching second symbols. In such an arrangement, the payout device determines a second payout based on the arrangement of the first symbols in combination with the second symbols in response to the secondary play event.

In more particular embodiments, the apparatus further includes a plurality of secondary reels, and the second symbols are randomly arranged on the secondary reels, and a portion of the secondary reels are each located between two of the gaming reels. The payout device may further determine the payout based on comparison of the first symbols to one or more fixed paylines. In such a case, the payout may include a first payout and a second payout. The first payout is provided based on the comparison of the first symbols to one or more fixed paylines, and the plurality of second symbols are each randomly arranged in response to the first payout. The second payout is subsequently determined based on the arrangement of the first symbols in combination with the second symbols. In other arrangement where the payout includes a first and second payout, the first payout is provided based on the comparison of the first symbols to one or more fixed paylines, and the plurality of second symbols are each randomly arranged in response to a side wager placed by the user. In such a case the second payout is subsequently determined based on the arrangement of the first symbols in combination with the second symbols.

In another embodiment of the invention, a method involves randomly arranging first symbols on a plurality of gaming reels in response to a gaming even and randomly arranging second symbols so that each of the second symbols is adjacent to an associated one of the first symbols. In response to the gaming event, a payout is determined based on the arrangement of the first symbols in combination with a payline formed by the associated second symbols.

BRIEF DESCRIPTION OF THE DRAWINGS

The invention is described in connection with the embodiments illustrated in the following diagrams.

DETAILED DESCRIPTION OF THE INVENTION

Figure 1:
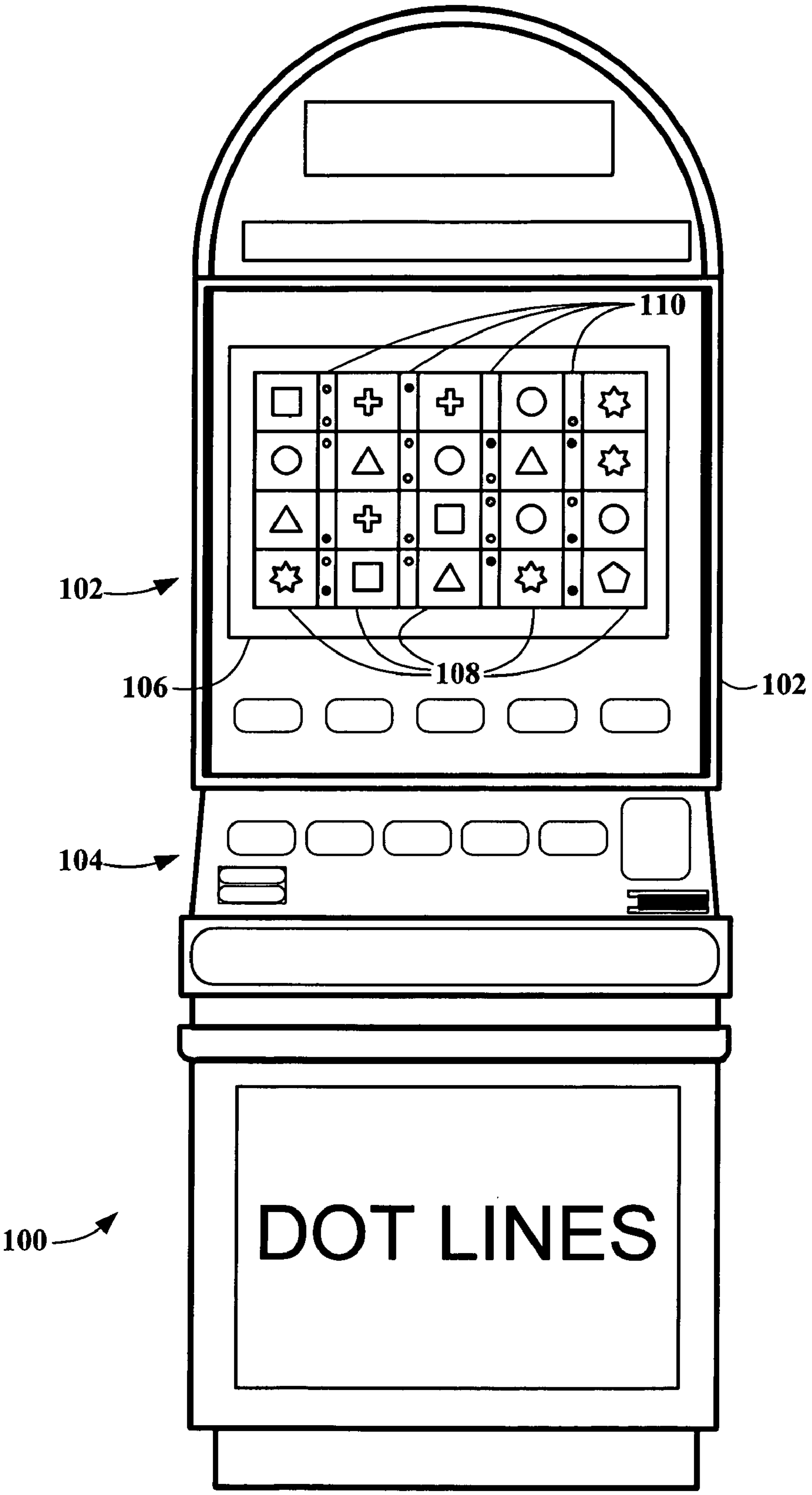
FIG. 1. is a diagram of a gaming machine according to an embodiment of the invention.

In the following description of various exemplary embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

Generally, the present invention relates to a wagering game that may resemble a reel-type gaming apparatus such as a slot machine. Generally, a reel-type apparatus provides a gaming activity that involves randomly arranging symbols in such a way as to provide a payout. A commonly implemented form of this apparatus involves using a number of side-by-side circular reels that spin on the same axis. These reels may be mechanical devices (e.g., wheels or hoops) or may be simulated via a computer and video display. The reels have symbols printed on their surface, and the player is provided a monetary award when the selected symbols form a pattern, such as when a horizontal line that spans all the reels has the same symbol. This line that connects symbols is sometimes referred to as the pay line (or payout line), and pay lines may also be diagonal or other shapes besides a line.

In an apparatus according to an embodiment of the invention, a secondary sequence of symbols is presented so as to appear between the reels of the primary game. The term "primary," as used herein, will generally refer to reels and associated symbols that are typical of existing slot machines. These slot machines typically use or simulate a plurality of reels with symbols on the reel's exterior surface. Generally, the reels are "spun" (or otherwise randomized) and a payout is determined by the arrangement of symbols along predetermined paylines. In embodiments described herein, this payout and/or payline determination is altered by the use of secondary symbols located between the primary reels (also referred to herein as "inter-reel symbols").

In one arrangement, the secondary symbols may appear as colored dots that can form paylines. These paylines may be alternative to or additional to traditional paylines, which are often depicted as horizontal or diagonal lines. The dots in such an arrangement may move separately from the primary symbol reels, or may have a fixed associated with the primary symbols, such as by being attached to the primary reels. The paylines may be formed by paths that connect same colored dots in the inter-reel areas, and matching of primary symbols that lie along these paylines can result in a payout.

In the description that follows, the term "reels," "reel strips," and similar mechanically descriptive language may be used to describe various apparatus presentation features. Although the present disclosure may be applicable to both to mechanical and computerized embodiments, and any combination therebetween, the use of mechanically descriptive terms is not meant to be only applicable to mechanical embodiments. Those skilled in the art will understand that, for purposes of providing gaming experiences to players, mechanical elements such as reels may be simulated on a display in order to provide a familiar and satisfying experience that emulates the behavior of mechanical objects. Further, the computerized version may provide the look of a reel (e.g., a linear arrangement of symbols) and inter-reel elements but are randomized in a way different than a spinning reel, such as by randomly and independently changing each cell of the reel that has a symbol. Thus, the term "reels," "reel strips," etc. are intended to describe both physical objects and emulation or simulations of those objects using electronic apparatus.

In various embodiments of the invention, the gaming displays are described in conjunction with the use of data in the form of "symbols." In the context of this disclosure, a "symbol" refers to a collection of one or more arbitrary indicia or signs that have some conventional significance. In particular, the symbol represents values that can at least be used to determine whether to award a payout. A symbol may include numbers, letters, shapes, pictures, textures, colors, sounds, etc., and any combination therebetween. A win can be determined by comparing the symbol with another symbol. Generally, such comparisons can be performed via software by mapping numbers (or other data structures such as character strings) to the symbols and performing the comparisons on the numbers/data structures.

In reference now to FIG. 1, a gaming machine 100 is illustrated that provides a gaming experience according to an embodiment of the invention. The illustrated gaming machine 100 may include a computing system (not shown) to carry out operations according described herein. The gaming machine 100 includes a display 102, and a user interface 104, although some or all of the user interface 104 may be provided via the display 102 in touch screen embodiments. The user interface 104 allows the user to control and engage in play of the gaming machine 100. The particular user interface mechanisms included with user interface 104 may be dependent on the type of gaming machine. For example, the user interface 104 may include one or more buttons, switches, joysticks, levers, pull-down handles, trackballs, voice-activated input, or any other user input system or mechanism that allows the user to play the particular gaming activity.

The user interface 104 may allow the user to enter coins, bills, or otherwise obtain credits through vouchers, tokens, credit cards, tickets, etc. Various mechanisms for entering such vouchers, tokens, credit cards, coins, tickets, etc. are known in the art. For example, coin/symbol input mechanisms, card readers, credit card readers, smart card readers, punch card readers, radio frequency identifier (RFID) readers, and other mechanisms may be used to enter wagers. It is through the user interface 104 that the user can initiate and engage in gaming activities. While the illustrated embodiment depicts various buttons for the user interface 104, it should be recognized that a wide variety of user interface options are available for use in connection with the present invention, including pressing buttons, touching a segment of a touch-screen, entering text, entering voice commands, or other known data entry methodology.

The display device 102 may include one or more of an electronic display, a mechanical display, and fixed display information such as information such as paytable information associated with a glass/plastic panel on the gaming machine 100. The symbols or other indicia associated with the play of the game may be presented on an electronic display device. Generally, the display 102 devotes the largest portion of viewable area to the primary gaming portion 106. The gaming portion 106 is generally where the visual feedback for any selected game is provided to the user. The gaming portion 106 may render graphical objects such as cards, slot reels, dice, animated characters, and any other gaming visual known in the art. The gaming portion 106 also typically informs players of the outcome of any particular event, including whether the event resulted in a win or loss.

In the illustrated embodiment, the gaming portion 106 displays a set of primary reels 108. The reels 108 each include symbols that may be animated so that the symbols appear to be on the surface of a wheel that is rotating vertically when game play is initiated. As is known in the art, when the symbols of the reels stop moving (typically after a random amount of time when physical reel devices are involved), the player may be provided a monetary award if some set of symbols on adjacent reels 108 satisfy some criteria. In addition to these standard play reels 108, the illustrated play area 106 includes inter-reel symbols 110 that may be configured as strips or reels that are randomized in conjunction with the primary reels 108.

Generally, this randomization may be achieved by rotating mechanical reels or a simulating rotation using computer animation (e.g., shifting inter-reel symbols 110 up or down for a predetermined amount of time). The inter-reel symbols 110 may move in the opposite or same direction as to the primary reels 108, and may move at the same or different rate than the primary reels 108. In another example, the inter-reel symbols 110 may be printed on the outside of a cylinder that rotates about a vertical axis (or simulated via computer graphics to have such an appearance), such that the symbols 110 rotate in a left-to-right direction while the primary reels 108 are rotating vertically.

In other arrangements, the inter-reel symbols 110 may be fixed in a space between the primary gaming reels 108. In such an arrangement, the symbols 110 may be randomized in other ways besides movement or simulated movement of a reel. For example, in configuration where the apparatus 100 includes mechanical reels 108, the inter-reel symbols 110 may be implemented as groups of differently colored lights that are randomly illuminated, or each symbol 110 may be implemented as a single light that is capable of changing its color or hue. This behavior may also be simulated in computer display implemented versions.

The inter-reel symbols 110 interact with the symbols of the primary reels 108. As will be explained in greater detail hereinbelow, the inter-reel symbols 110 may be used to determine paylines of primary or bonus gaming events associated with the primary reels 108. In the example shown in FIG. 1, the inter-reel symbols 110 include dots that may be visually distinguished from one another, such as by color. Symbols of the primary reels 108 may each be associated with zero or more of these dots 110 when randomization of the reels 108 and symbols 110 is complete. In such an arrangement, horizontally adjacent dots 110 may be used to form a payline for determining whether the arrangement of the primary reels 108 will provide payouts. Where a primary reel symbol is associated with two or more of the inter-reel symbols 110, that primary reel may participate in two or more payouts.

Figure 2:
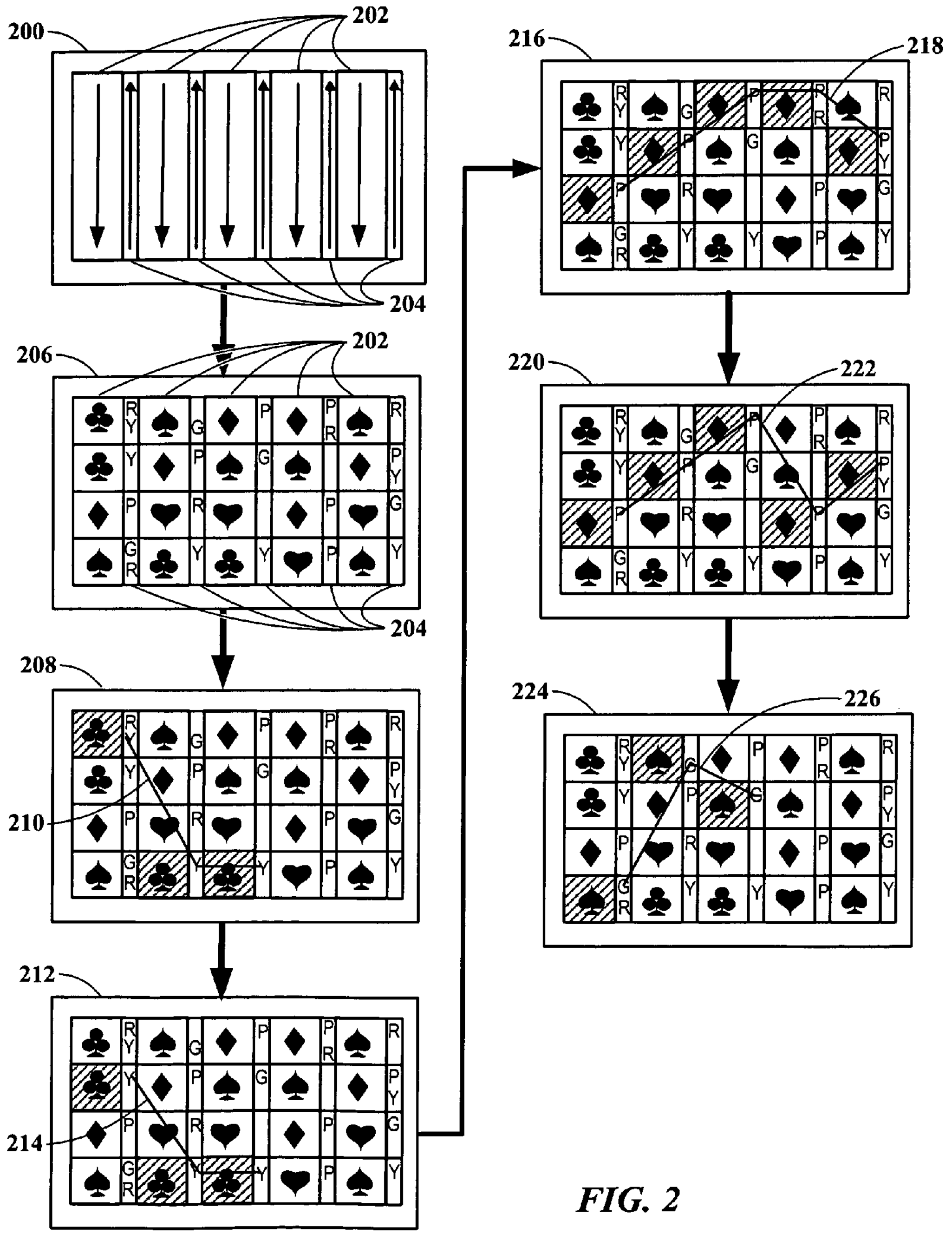
FIG. 2 is a sequence diagram showing a sequence of gaming screens in a gaming apparatus according to an embodiment of the invention.

The sequence diagram of FIG. 2 shows an example of how inter-reel payline game play may proceed. This sequence diagram illustrates various game play states or screens that might be seen in a gaming apparatus according to embodiments of the invention. Screen 200 shows primary reels 202 and secondary reels 204 being randomized by spinning, as indicated by the vertical arrows. Note that secondary reels 204 are each between two of the primary reels except for the rightmost of the secondary reels 204. This or similar configurations may be necessary where a one-to-one correspondence between primary and secondary reels 202, 204 is desired.

The screen 200 is typically seen after the player has made a wager and initiated play, such as by pulling a lever or pushing a button. The randomization of the symbols associated the reels 202, 204 may be accomplished in other ways besides using vertically spinning reels, as is described elsewhere herein. Further, the relative movement of the reels 202, 204 may be different than shown, and the reels 202, 204 need not spin at the same time. As an example of the latter, the primary reels 202 may be part of a primary gaming event that determines payouts based on fixed paylines, and the secondary reels 204 may be spun afterwards to determine additional wins based on random paylines generated by the secondary reels. This spin of the secondary reels 204 may be in response to a bonus event, an additional wager, or some other play event or feature. In other arrangements, the secondary reels 204 may be spun one or more times before the primary reels to determine the paylines, after which the primary reels 202 are spun one or more times to determine payouts.

In screen 206, the randomization of reels 202, 204 is complete, and wins may be evaluated. The secondary reels 204 may contain symbols such as colored dots. For clarity, the illustrated screen 206 uses letters to represent a different color, in particular "R" for red, "G" for green, "P" for purple, and "Y" for yellow. Paylines may be formed by these secondary reel symbols, and applied to symbols of the primary reels 202 to determine payouts. The determination of possible payouts for this arrangement 206 is shown in subsequent screens 208, 212, 216, 220, and 224. In screens 208 and 212, respective paylines 210, 214 are formed by matching adjacent yellow symbols of the secondary reel. In both screens 208, 212, the paylines 210, 214 correspond to a continuous sequence of three clubs along the paylines 210, 214, and a payout may be awarded based on this sequence of symbols. Similar paylines 218, 222 are seen in screens 216 and 220 for purple secondary symbols, and payline 226 in screen 224 is associated with matching green secondary symbols.

Figure 3:
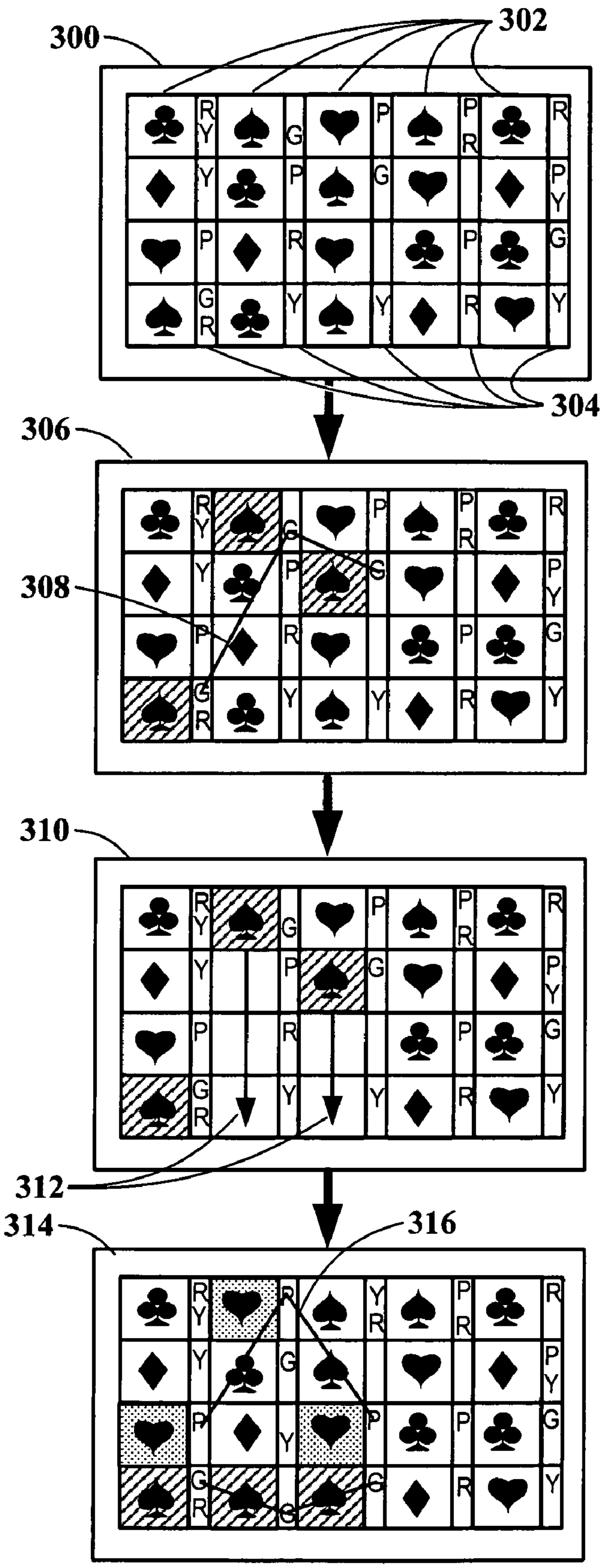
FIG. 3 is a sequence diagram showing an alternate sequence of gaming screens in a gaming apparatus according to an embodiment of the invention.

A variation on a game that uses inter-reel symbols is shown in the block diagram of FIG. 3. In screen 300, the primary reels 302 and dot reels 304 have stopped spinning. In screen 306, a payout is initially evaluated, as represented by payline 308. Thereafter, as seen in screen 310, selected reels spin backwards to straighten out the lines, as indicated by arrows 312. This backwards movement may be applied to both primary and secondary reels 302, 304, and may occur for one or more color of dots. If a game includes both fixed and variable paylines, just one of the random paylines may be selected for this backwards movement. As seen in screen 314, any wins made when the reels have been spun backwards are evaluated as indicated by payline 316. This could be a bonus feature, or part of normal play.

Figure 4A:
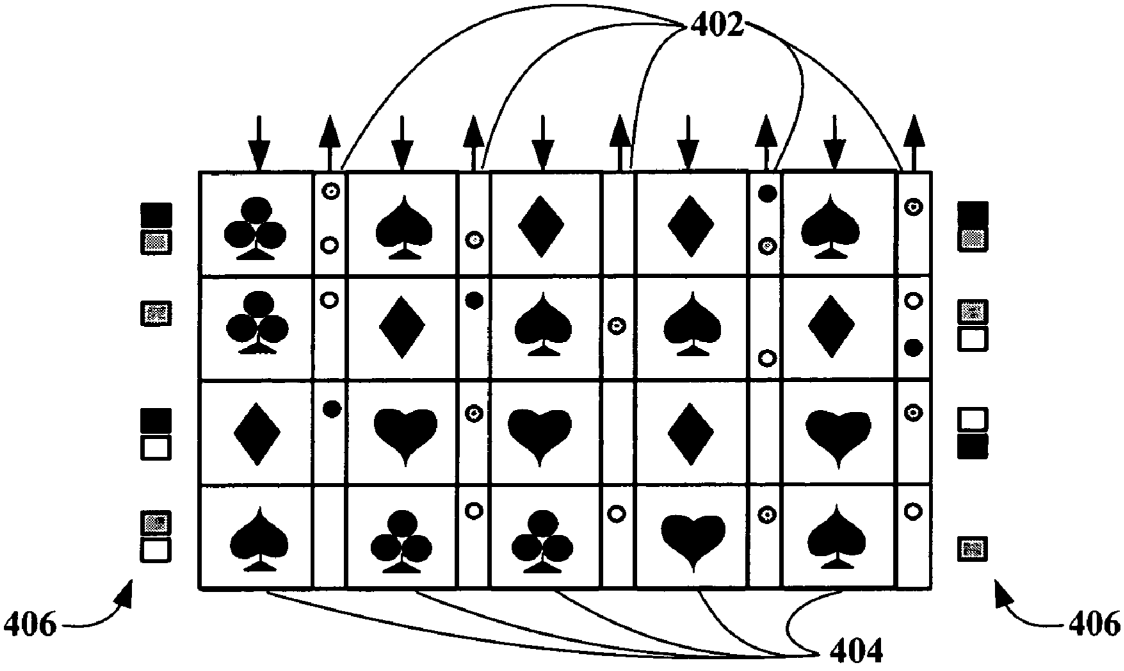
FIG. 4A is a block diagram showing a gaming interface that provides both predetermined and random paylines according to an embodiment of the invention.
Figure 4B:
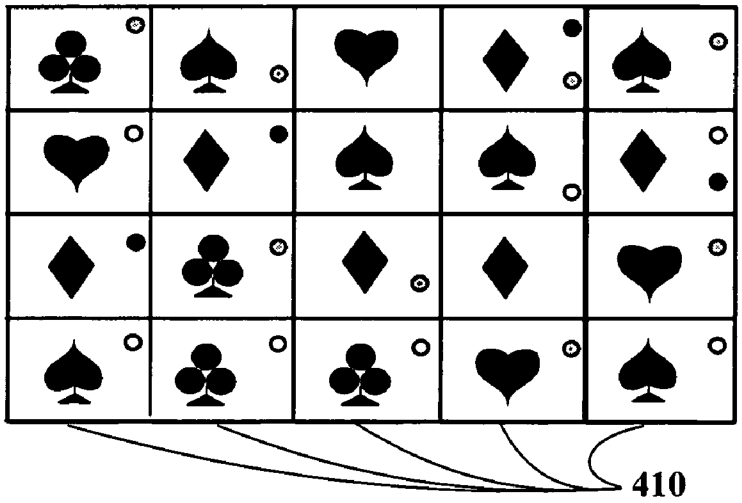
FIG. 4B is a block diagram showing a gaming interface that includes secondary symbols integrated in the cells of the primary symbols.

In the previous examples, the secondary symbols were placed, at least in part, in inter-reel spaces. Alternate arrangements of secondary symbols according to embodiments of the invention are shown in FIGS. 4A and 4B. In FIG. 4A, a game includes secondary reels 402 and primary reels 404 that are independently randomized as described hereinabove. In addition, a number of external symbols 406 may indicate relatively static paylines that may be part of a primary event. The external symbols 406 may provide a payout independently of payouts determined by the dot reels 402. In another embodiment, the external symbols 406 may be used with the secondary symbols 402 to determine a bonus award. For example, if each cell of a row includes a secondary symbol 402 of the same color, and if flanking external/static symbols 406 also include that color, then multipliers or independent payouts may occur.

In FIG. 4B, a playing area includes reels 410 that each have a gaming symbol (e.g., card suits as shown here) and a secondary symbol (e.g., colored dots). The dots may be permanently or semi-permanently associated with a corresponding symbol, or the dots may be randomized along with the symbols for each playing event. The embodiment in FIG. 4B can be implemented in mechanical reels, for example, by including a fixed set of lights in each cell of the reels 410 and randomly turning off or on selected lights. In other embodiments, the lights may be able to take on different colors (e.g., such as can be accomplished with a light-emitting diode) and one or more lights with each cell is each randomly assigned a color.

In other arrangements, the secondary symbols may be some feature of the reels 410 themselves and not be shown as an explicitly rendered symbol. For example, the cells of the reels 410 may change to different background colors, the background colors representing different symbols. Where a game allows more than one secondary symbol to be associated with a primary symbol, the background may take multiple colors, e.g., by drawing the background with a multicolor pattern such as stripes or checks.

Although the primary and reels in the illustrated embodiments are shown "spinning" vertically, other arrangement may also be possible. For example, one or both of the reels may be arranged to spin horizontally. In one arrangement, dot reels may be configured as relatively narrow "poles" that spin along a vertical axis between (or next to) primary reels that spin on a horizontal axis. In other arrangements, the reels may use some other actual or simulated randomization method. For example, each cell in the reels may change randomly independent of adjacent cells.

Figure 5:
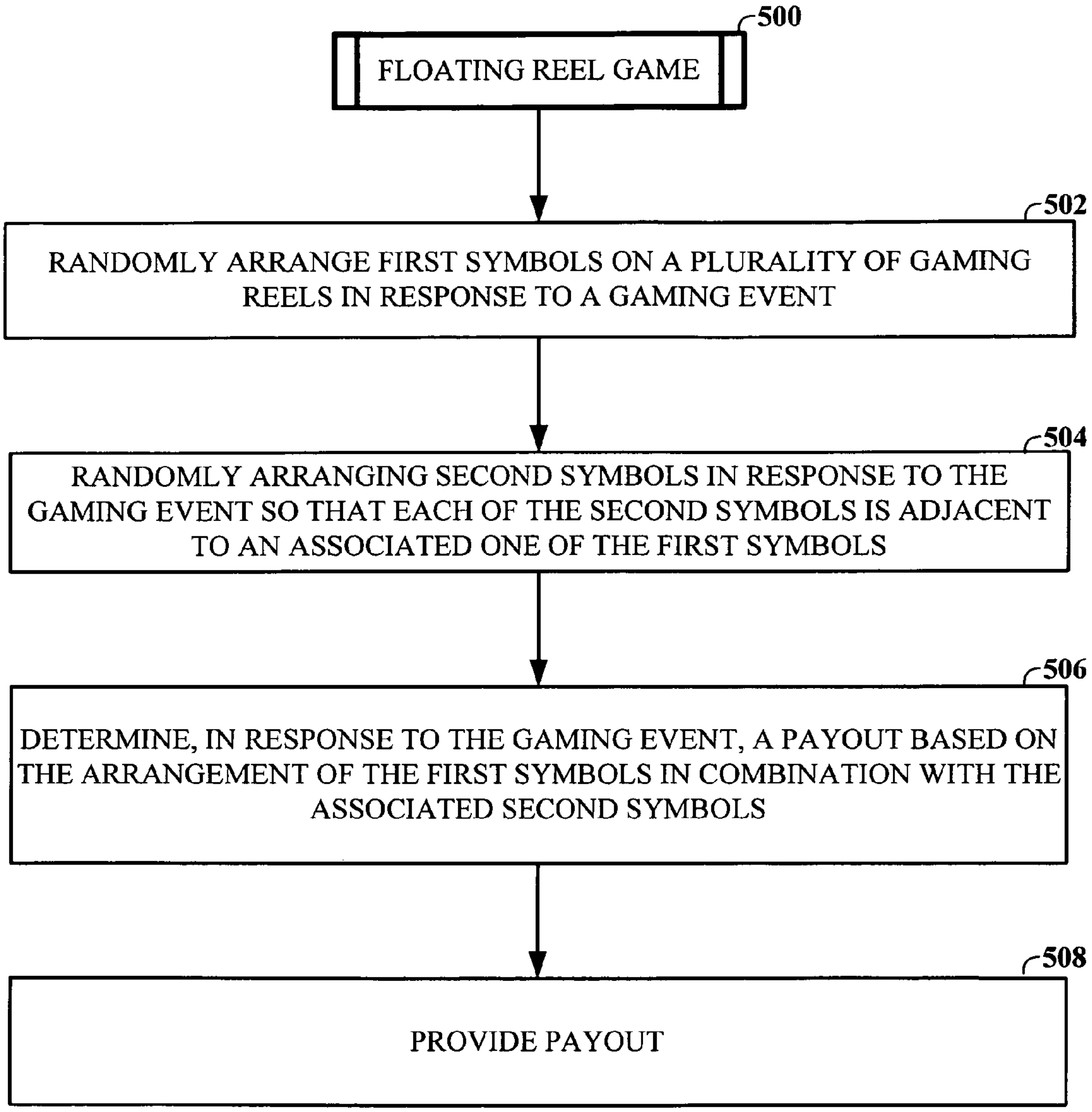
FIG. 5 is a flowchart illustrating a gaming procedure according to an embodiment of the invention.

In reference now to FIG. 5, an example procedure 500 is illustrated for providing a gaming experience according to embodiments of the invention. First symbols are randomly arranged 502 on a plurality of gaming reels in response to a gaming event. Second symbols are randomly arranged 504 so that each of the second symbols is adjacent to an associated one of the first symbols. The arrangement 504 of the secondary symbols may be in response to the same gaming event that caused the arrangement 502 of the first symbols, or may be a different event (e.g., bonus event). In response to the gaming event, a payout is determined 506 based on the arrangement of the first symbols in combination with the associated second symbols, and as a result a payout is provided 508.

Figure 6:
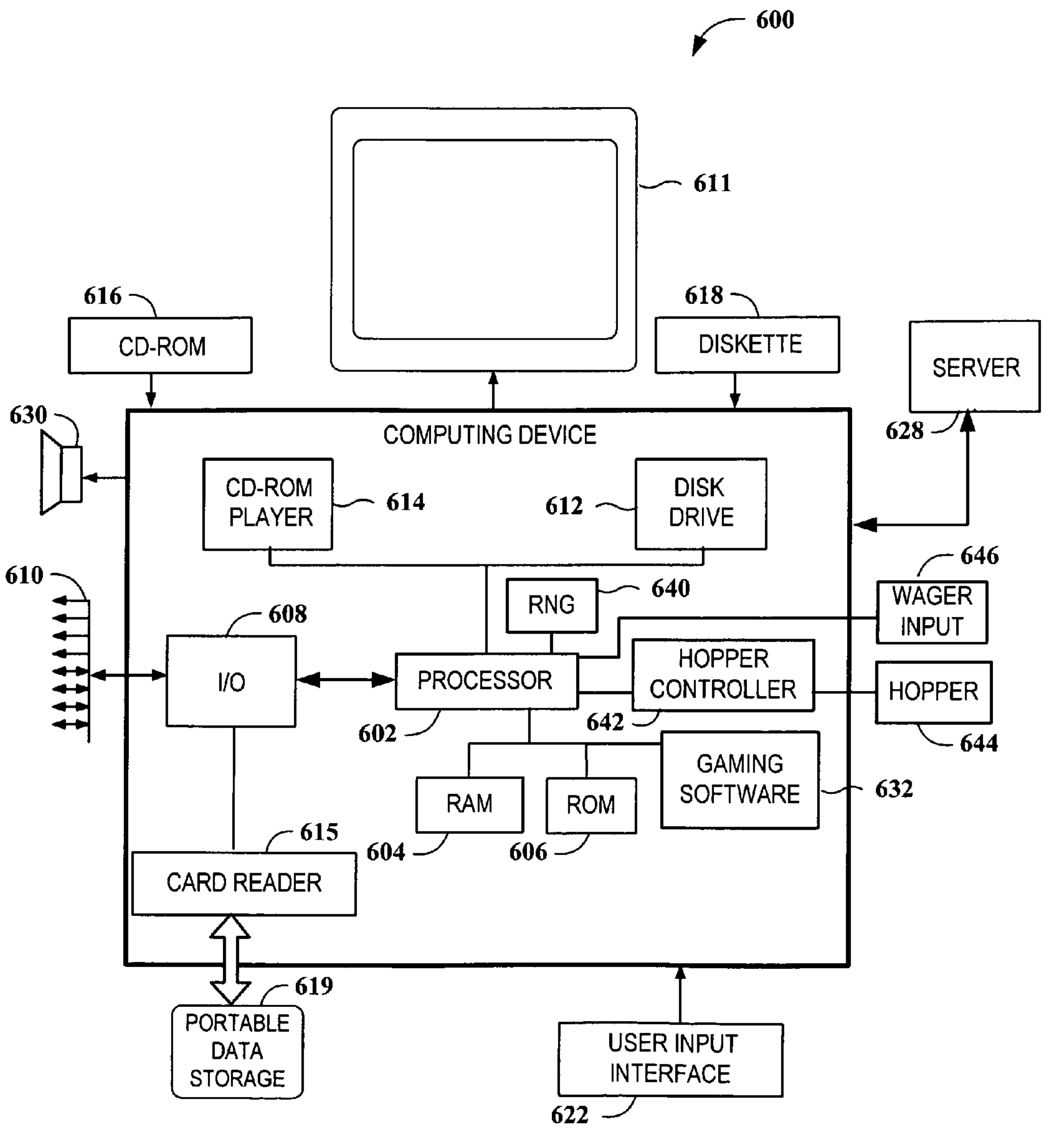
FIG. 6 is a block diagram illustrating a computing arrangement according to an embodiment of the invention.

As may now be readily understood, one or more devices may be programmed to play various embodiments of the invention. The present invention may be implemented as a casino gaming machine such as a slot machine or other special purpose gaming kiosk as described hereinabove, or may be implemented via computing systems operating under the direction of local gaming software, and/or remotely-provided software such as provided by an application service provider (ASP). The casino gaming machines utilize computing systems to control and manage the gaming activity. An example of a representative computing system capable of carrying out operations in accordance with the invention is illustrated in FIG. 6.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 600 of FIG. 6 is an example computing structure that can be used in connection with such electronic gaming machines, computers, or other computer-implemented devices to carry out operations of the present invention.

The example computing arrangement 600 suitable for performing the gaming functions in accordance with the present invention typically includes a central processor (CPU) 602 coupled to random access memory (RAM) 604 and some variation of read-only memory (ROM) 606. The ROM 606 may also represent other types of storage media to store programs, such as programmable ROM (PROM), erasable PROM (EPROM), etc. The processor 602 may communicate with other internal and external components through input/output (I/O) circuitry 608 and bussing 610, to provide control signals, communication signals, and the like.

The computing arrangement 600 may also include one or more data storage devices, including hard and floppy disk drives 612, CD-ROM drives 614, card reader 615, and other hardware capable of reading and/or storing information such as DVD, etc. In one embodiment, software for carrying out the operations in accordance with the present invention may be stored and distributed on a CD-ROM 616, diskette 618, access card 619, or other form of media capable of portably storing information. These storage media may be inserted into, and read by, devices such as the CD-ROM drive 614, the disk drive 612, card reader 615, etc. The software may also be transmitted to the computing arrangement 600 via data signals, such as being downloaded electronically via a network, such as the Internet. Further, as previously described, the software for carrying out the functions associated with the present invention may alternatively be stored in internal memory/storage of the computing device 600, such as in the ROM 606.

The computing arrangement 600 is coupled to the display 611, which represents a display on which the gaming activities in accordance with the invention are presented. The display 611 represents the "presentation" of the video information in accordance with the invention, and may be any type of known display or presentation screen, such as LCD displays, plasma display, cathode ray tubes (CRT), digital light processing (DLP), liquid crystal on silicon (LCOS), etc. Where the computing device 600 represents a stand-alone or networked computer, the display 611 may represent a standard computer terminal or display capable of displaying multiple windows, frames, etc. Where the computing device is embedded within an electronic gaming machine, the display 611 corresponds to the display screen of the gaming machine/kiosk. A user input interface 622 such as a mouse, keyboard/keypad, microphone, touch pad, trackball, joystick, touch screen, voice-recognition system, etc. may be provided. The display 611 may also act as a user input device, e.g., where the display 611 is a touchscreen device.

Chance-based gaming systems such as slot machines, in which the present invention is applicable, are governed by random numbers and processors, as facilitated by a random number generator (RNG). In particular, the fixed and dynamic symbols generated as part of a gaming activity may be produced using one or more RNGs. RNGs are known in the art, and may be implemented using hardware, software operable in connection with the processor 602, or some combination of hardware and software. The present invention is operable using any known RNG, and may be integrally programmed as part of the processor 602 operation, or alternatively may be a separate RNG controller 640.

The computing arrangement 600 may be connected to other computing devices or gaming machines, such as via a network. The computing arrangement 600 may be connected to a network server 628 in an intranet or local network configuration. The computer may further be part of a larger network configuration as in a global area network (GAN) such as the Internet. In such a case, the computer may have access to one or more web servers via the Internet.

Other components directed to gaming machine implementations include manners of gaming participant payment, and gaming machine payout. For example, a gaming machine including the computing arrangement 600 may also include a hopper controller 642 to determine the amount of payout to be provided to the participant. The hopper controller may be integrally implemented with the processor 602, or alternatively as a separate hopper controller 642. A hopper 644 may also be provided in gaming machine embodiments, where the hopper serves as the mechanism holding the coins/tokens of the machine. The wager input module 646 represents any mechanism for accepting coins, tokens, coupons, bills, electronic fund transfer (EFT), tickets, credit cards, smart cards, membership cards, etc., for which a participant inputs a wager amount. It will be appreciated that the primary gaming software 632 may be able to control payouts via the hopper 644 and controller 642 for independently determined payout events.

Among other functions, the computing arrangement 600 provides an interactive experience to players via input interface 622 and output devices, such as the display 611, speaker 630, etc. These experiences are generally controlled by gaming software 632 that controls a primary gaming activity of the computing arrangement 600. The gaming software 632 may be temporarily loaded into RAM 604, and may be stored locally using any combination of ROM 606, drives 612, or media player 614. The primary gaming software 632 may also be accessed remotely, such as via the server 628 or the Internet.

The primary gaming software 632 in the computing arrangement 600 according to embodiments of the present invention provides a floating reel-type gaming experience as defined hereinabove. For example, the software 632 may present, by way of the display 611, a plurality of gaming reels a plurality of gaming reels each having a plurality of first symbols that are randomly arranged in response to a gaming event. The software 632 may also present a plurality of second symbols that are each randomly arranged so that each of the second symbols adjacent to an associated one of the first symbols. The software 632 determines a payout based on the arrangement of the first symbols in combination with the associated second symbols in response to the gaming event, such as by a payline formed by the second symbols. The software 632 may also provide, by way of the hopper controller 642, a monetary award to the player based on the arrangement of the first symbols in combination with the second symbols.

The foregoing description of the exemplary embodiments of the invention has been presented for the purposes of illustration and description. It is not intended to be exhaustive or to limit the invention to the precise form disclosed. Many modifications and variations are possible in light of the above teaching. For example, the present invention is equally applicable in electronic or mechanical gaming machines, and is also applicable to live table versions of the gaming activities. It is intended that the scope of the invention be limited not with this detailed description, but rather determined from the claims appended hereto.

What is claimed is:

1. A gaming apparatus comprising:

a plurality of gaming reels each having a plurality of first symbols that are randomly arranged in response to a gaming event;

a plurality of second symbols that are each randomly arranged so that each of the second symbols is adjacent to an associated one of the first symbols;

a payout device that determines a payout based on the arrangement of the first symbols in combination with paylines formed by the associated second symbols in response to the gaming event;

wherein the paylines are formed by a sequence of matching second symbols, wherein the first symbols associated with the matching second symbols also match; and wherein the matching first symbols and the matching second symbols are involved in a secondary play event that occurs after the payout is determined, wherein the secondary play event involves:

moving the matching second symbols so that the payline formed by the matching second symbols is a straight line;

moving the gaming reels having the matching first symbols so that the matching first symbols remain associated with the matching second symbols; and wherein the payout device determines a second payout based on the arrangement of the first symbols in combination with the second symbols in response to the secondary play event.

2. A method comprising:

randomly arranging first symbols on a plurality of gaming reels in response to a gaming event;

randomly arranging second symbols so that each of the second symbols is adjacent to an associated one of the first symbols;

determining, in response to the gaming event, a payout based on the arrangement of the first symbols in combination with a payline formed by the associated second symbols;

wherein the paylines are formed by a sequence of matching second symbols, and wherein the payout is determined based on the matching of the first symbols associated with the matching second symbols;

wherein the matching first symbols and the matching second symbols are involved in a secondary play event that occurs after the payout is determined, wherein the secondary play event involves:

moving the matching second symbols so that the payline formed by the matching second symbols is a substantially straight line;

moving the gaming reels having the matching first symbols so that the matching first symbols remain associated with the matching second symbols; and a second payout is determined based on the arrangement of the first symbols in combination with the second symbols in response to the secondary play event.

3. A system comprising:

means for randomly arranging first symbols on a plurality of gaming reels in response to a gaming event;

means for randomly arranging second symbols so that each of the second symbols is adjacent to an associated one of the first symbols;

means for determining, in response to the gaming event, a payout based on the arrangement of the first symbols in combination with a payline formed by the associated second symbols;

wherein the payline is formed by a sequence of matching second symbols, and wherein the payout is determined based on the matching of the first symbols associated with the matching second symbols, the system further comprising:

means for moving the matching second symbols so that the payline formed by the matching second symbols is a substantially straight line;

means for moving the gaming reels having the matching first symbols so that the matching first symbols remain associated with the matching second symbols; and means for determining a second payout based on the arrangement of the first symbols in combination with the second symbols in response to the secondary play event.

* * * * *